United States Patent
Hong (10) Patent No.: US 12,489,849 B2
(45) Date of Patent: Dec. 2, 2025

(54) VIDEO GREETING PLAYING METHOD, SYSTEM, SERVER AND STORAGE MEDIUM

(71) Applicant: ZTE CORPORATION, Shenzhen (CN)

(72) Inventor: Guolin Hong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 259 days.

(21) Appl. No.: 18/254,660

(22) PCT Filed: Nov. 16, 2021

(86) PCT No.: PCT/CN2021/130982
§ 371 (c)(1),
(2) Date: May 26, 2023

(87) PCT Pub. No.: WO2022/116816
PCT Pub. Date: Jun. 9, 2022

(65) Prior Publication Data
US 2024/0187527 A1    Jun. 6, 2024

(30) Foreign Application Priority Data

Dec. 3, 2020 (CN) .......................... 202011409317.2

(51) Int. Cl.
*H04M 3/533* (2006.01)
*H04L 65/1096* (2022.01)

(52) U.S. Cl.
CPC .... *H04M 3/53391* (2013.01); *H04L 65/1096* (2013.01); *H04M 2242/24* (2013.01)

(58) Field of Classification Search
CPC ......... H04M 3/53391; H04M 2242/24; H04M 2203/252; H04M 3/53383; H04M 7/0072;
(Continued)

(56) References Cited

U.S. PATENT DOCUMENTS

| | | | |
|---|---|---|---|
| 6,020,916 A * | 2/2000 | Gerszberg | ................ H04N 7/15 348/E7.083 |
| 6,400,693 B2 | 6/2002 | Otani | |

(Continued)

FOREIGN PATENT DOCUMENTS

| CN | 101119250 A | 2/2008 |
|---|---|---|
| CN | 106303104 A | 1/2017 |

(Continued)

OTHER PUBLICATIONS

First Office Action in Corresponding Japanese Application No. 2023-534217, dated Jun. 28, 2024; 10 pgs.
(Continued)

*Primary Examiner* — Lisa Hashem
(74) *Attorney, Agent, or Firm* — HAUPTMAN HAM, LLP (57) ABSTRACT

Embodiments of the present application relate to the technical field of communication, and provide a video greeting playing method, system, server and storage medium. The video greeting playing method includes: in response to receiving a call transfer request indicating that a first terminal fails to call a second terminal, acquiring a type of a media channel currently accessed by the first terminal; in response to that the type of the media channel currently accessed by the first terminal is audio, performing video media negotiation with the first terminal; and in response to that the video media negotiation with the first terminal succeeds, sending a video greeting pre-recorded by the second terminal to the first terminal for the first terminal to play the video greeting.

8 Claims, 8 Drawing Sheets

(58) Field of Classification Search
CPC .. H04M 3/533; H04L 65/1096; H04L 67/141; H04L 69/24; H04L 69/40; H04L 65/1046; H04L 65/1069; H04L 65/61; H04L 67/148; H04L 65/60
See application file for complete search history.

(56) References Cited

U.S. PATENT DOCUMENTS

| | | | | |
|---|---|---|---|---|
| 6,633,635 | B2* | 10/2003 | Kung | H04M 3/428 379/215.01 |
| 9,760,892 | B2* | 9/2017 | Bourguignon | H04M 3/5233 |
| 10,893,152 | B2* | 1/2021 | Russell | G06Q 30/0631 |
| 11,570,402 | B2* | 1/2023 | Ahn | H04N 7/147 |
| 2002/0055352 | A1 | 5/2002 | Samata | |
| 2003/0133558 | A1* | 7/2003 | Kung | H04M 3/4288 379/215.01 |
| 2004/0037266 | A1* | 2/2004 | Roberts | H04M 3/4281 379/215.01 |
| 2004/0037410 | A1* | 2/2004 | Roberts | H04M 3/20 379/215.01 |
| 2006/0104425 | A1 | 5/2006 | Peters | |
| 2007/0139513 | A1* | 6/2007 | Fang | H04N 7/142 348/14.01 |
| 2008/0002022 | A1* | 1/2008 | VanEpps | H04N 7/147 348/E7.081 |
| 2015/0222753 | A1 | 8/2015 | Noldus | |

FOREIGN PATENT DOCUMENTS

| | | |
|---|---|---|
| CN | 108353145 A | 7/2018 |
| CN | 111193688 A | 5/2020 |
| JP | H07203071 A | 8/1995 |
| JP | H07245747 A | 9/1995 |
| JP | H1069330 A | 3/1998 |
| JP | 2001186262 A | 7/2001 |
| JP | 2001197459 A | 7/2001 |
| JP | 2005101896 A | 4/2005 |
| JP | 2005278032 A | 10/2005 |
| JP | 2007142588 A | 6/2007 |
| JP | 2008098801 A | 4/2008 |
| WO | 2020073998 A1 | 4/2020 |

OTHER PUBLICATIONS

International Search Report and Written Opinion issued in International Application No. PCT/CN2021/130982; mailed Jan. 30, 2022; 14 pgs.
Extended Search Report in Corresponding European Application No. 21899850.8 dated Jan. 23, 2024; 12 pgs.
Intention to Grant in Corresponding European Application No. 21 899 850.8, dated Jun. 26, 2025; 45 pgs.
Notification of Grant in Corresponding Korean Application No. 10-2023-7019867, dated Jun. 2, 2025; 5 pgs.

* cited by examiner

VIDEO GREETING PLAYING METHOD, SYSTEM, SERVER AND STORAGE MEDIUM

CROSS-REFERENCE TO RELATED APPLICATIONS

The present application is the National Stage of International Application No. PCT/CN2021/130982, filed on Nov. 16, 2021, which claims priority to Chinese Patent Application No. 202011409317.2, filed on Dec. 3, 2020, the entire contents of which are incorporated herein by reference.

TECHNICAL FIELD

Embodiments of the present application relate to the technical field of communication, and in particular to a video greeting playing method, system, server and storage medium.

BACKGROUND

The voice mail system (VMS) is a system based on various networks, with voice information interaction as the main function. The VMS can provide users with services such as storing, forwarding and retrieving voice messages. When the calling user fails to call the called user, the VMS can receive the call transfer request, transfer the call to the voice mail of the called user according to the call transfer request, and play a greeting to the calling user. The calling user can record a message for the called user in the voice mail according to the prompt of the greeting.

As communication technology develops rapidly, more and more communication devices can support video call services well. Video calls are usually a communication method that transmits people's audio streams and video streams in real time between communication devices based on the Internet and mobile Internet terminals. Correspondingly, the VMS also starts to support playing video greeting, and supports calling users to record video messages for called users.

However, in the case that the calling user terminal is an audio call, even if the voice mail of the called user is provided with a video greeting, the calling user terminal can only play the audio greeting and leave an audio message, which seriously restricts the functions of the VMS, cannot fully meet the requirements of users, and brings bad experience to users.

SUMMARY

Embodiments of the present application provide a video greeting playing method, applied to a server, including following operations: in response to receiving a call transfer request indicating that a first terminal fails to call a second terminal, acquiring a type of a media channel currently accessed by the first terminal; in response to that the type of the media channel currently accessed by the first terminal is audio, performing video media negotiation with the first terminal; and in response to that the video media negotiation with the first terminal succeeds, sending a video greeting pre-recorded by the second terminal to the first terminal for the first terminal to play the video greeting.

Embodiments of the present application further provide a video greeting playing method, applied to a first terminal, including following operations: in response to that an audio call to a second terminal fails, receiving a video greeting pre-recorded by the second terminal sent by a server, and playing the video greeting.

Embodiments of the present application further provide a video greeting playing system, including: a core network, a server, a first terminal and a second terminal: the core network is configured to send to the server a call transfer request indicating that the first terminal fails to call the second terminal after determining that the first terminal fails to call the second terminal; the server is configured to receive the call transfer request, and acquire a type of a media channel currently accessed by the first terminal; in response to that the type of the media channel currently accessed by the first terminal is audio, perform video media negotiation with the first terminal; in response to that the video media negotiation with the first terminal succeeds, send a video greeting pre-recorded by the second terminal to the first terminal; and the first terminal is configured to initiate a call to the second terminal; in response to that the call fails, perform video media negotiation with the server, receive and play the video greeting pre-recorded by the second terminal sent by the server.

Embodiments of the present application further provide a server, including: at least one processor; and a memory communicated with the at least one processor. The memory stores instructions executable by the at least one processor, when the instructions are executed by the at least one processor, the at least one processor performs the video greeting playing method as described above.

Embodiments of the present application further provide a computer-readable storage medium storing a computer program, when the computer program is executed by the processor, the video greeting playing method as described above is realized.

DETAILED DESCRIPTION OF THE EMBODIMENTS

The main purpose of the embodiment of the present application is to provide a video greeting playing method, system, server and storage medium. When a user terminal that supports video calls initiates an audio call, the user terminal can also play a video greeting, which greatly enriches the functional scope of the voice mail service, improves user experience, and increases user stickiness and activity.

In order to make the purpose, technical solutions and advantages of the embodiments of the present application clearer, the embodiments of the present application will be described in detail below with reference to the accompanying drawings. However, those of ordinary skill in the art can understand that in each embodiment of the present application, many technical details are provided for readers to better understand the present application. However, even without these technical details and various changes and modifications based on the following embodiments, the technical solutions claimed in the present application can also be realized. The division of the following embodiments is for the convenience of description, and should not constitute any limitation to the specific implementation of the present application, and the embodiments can be combined and referred to each other on the premise of no contradiction.

A first embodiment of the present application relates to a video greeting playing method, which is applied to a server. The implementation details of the video greeting playing method in this embodiment will be described in detail below. The following contents are only implementation details provided for easy understanding, and are not necessary for implementing this solution.

Figure 1:
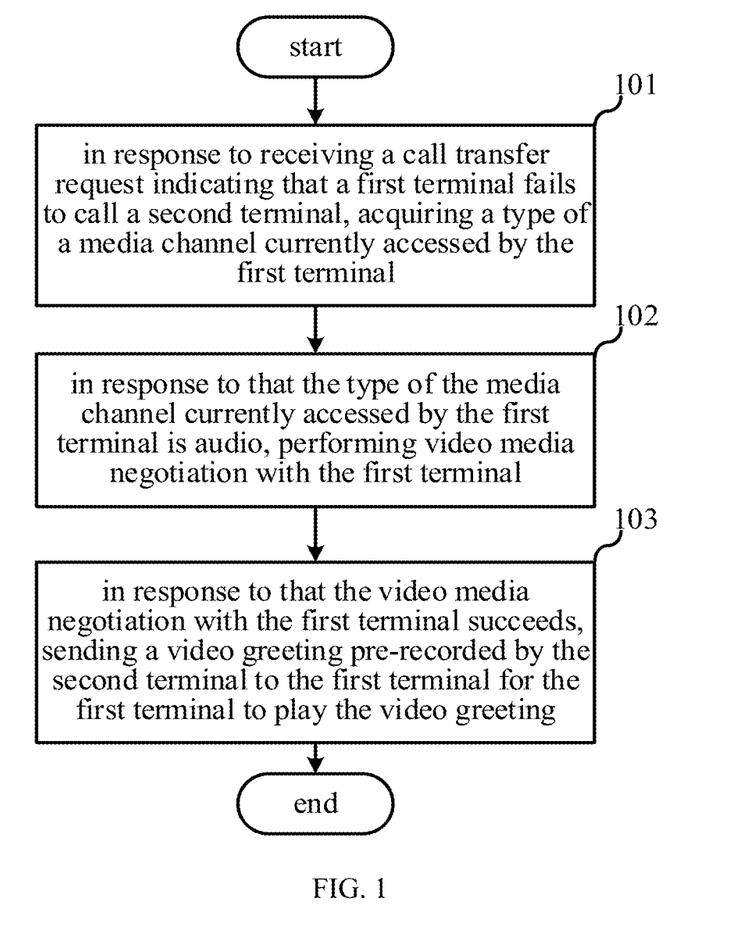
FIG. 1 is a flowchart of a video greeting playing method according to a first embodiment of the present application.

The specific flowchart of the video greeting playing method of the present embodiment can be as shown in FIG. 1, including:

Operation 101, in response to receiving a call transfer request indicating that a first terminal fails to call a second terminal, acquiring a type of a media channel currently accessed by the first terminal.

Specifically, the server may receive in real time a call transfer request indicating that the call from the first terminal to the second terminal fails. If the call transfer request is received, the server may acquire the type of the media channel currently accessed by the first terminal in the call transfer request.

In a specific implementation, the core network for carrying call services can monitor calls between terminals in real time. When the first terminal fails to call the second terminal, the core network can determine whether the second terminal has subscribed to the voice mail service. If the second terminal has subscribed to the voice mail service, the core network generates a call transfer request and sends the call transfer request to the server for carrying the voice mail service, and transfers the call to the server. The server receives the call transfer request, and acquires the type of the media channel currently accessed by the first terminal. If the second terminal has not subscribed to the voice mail service, the core network waits for the first terminal to initiate a call release instruction, and after receiving the call release instruction, the core network releases the call.

In an embodiment, the type of the media channel currently accessed by the first terminal may be audio, that is, the first terminal initiates an audio call. The audio coding capabilities may include, but are not limited to: advanced audio coding (AAC for short), adaptive differential pulse code modulation (ADPCM for short), and free lossless audio codec (FLAC for short), and the like.

In another embodiment, the type of the media channel currently accessed by the first terminal may be video, that is, the first terminal initiates a video call, and the video encoding capabilities may include, but are not limited to: H.263, H.264, etc.

Operation 102, in response to that the type of the media channel currently accessed by the first terminal is audio, performing video media negotiation with the first terminal.

The video media negotiation between the server and the first terminal may be understood as that the server initiates the video media negotiation to the first terminal.

Specifically, after the server acquires the type of the media channel currently accessed by the first terminal, it is determined whether the type of the media channel currently accessed by the first terminal is audio. If the type of the media channel currently accessed by the first terminal is audio, the server actively initiates video media negotiation to the first terminal. If the type of the media channel currently accessed by the first terminal is video, the server does not need to initiate video media negotiation to the first terminal, and directly performs subsequent data transmission. The video media negotiation is configured to change the type of the media channel accessed by the first terminal to video, which can effectively improve the flexibility of the call process.

In a specific implementation, the signaling responsible for video media negotiation with the first terminal can be set by those skilled in the art according to actual needs, such as update signaling and/or re-invite signaling, etc., which are not specifically limited in the embodiments of the present application.

In an embodiment, the server determines that the type of the media channel currently accessed by the first terminal is audio, and the audio coding capability of the first terminal is AAC, then the server may send a re-invite signaling to the first terminal to perform video media negotiation that the video encoding capability is H.264.

Operation 103, in response to that the video media negotiation with the first terminal succeeds, sending a video greeting pre-recorded by the second terminal to the first terminal for the first terminal to play the video greeting.

Specifically, after the server initiates video media negotiation to the first terminal, it may determine whether the video media negotiation with the first terminal succeeds. If the video media negotiation with the first terminal succeeds, the server may send the video greeting pre-recorded by the second terminal to the first terminal for the first terminal to play the video greeting. The media negotiation is a relationship between request and response. The first terminal initiates the audio call, which means that the first terminal uses the audio capability to request the server, and the server naturally responds with the audio capability. The server actively initiates video media negotiation to the first terminal, that is, the server uses the video capability to request the first terminal. If the first terminal has the video capability, the first terminal can respond with the video capability, and the video media negotiation succeeds. If the first terminal does not have the video capability, the first terminal cannot respond to the server's video capability request, and the video media negotiation fails. Performing the video media negotiation with the first terminal can realize the conversion of an audio-initiated call to a video call. When the terminal initiates the audio call, the terminal can also play the video greeting, which greatly enriches the functional scope of the voice mail service, improves the user experience, and increases user stickiness and activity.

In an embodiment, after the server sends the video greeting pre-recorded by the second terminal to the first terminal for the first terminal to play the video greeting, the server can also instruct the first terminal to record a message according to the video greeting. The message can be an audio message and/or a video message. When a user terminal that supports video calling initiates the audio call, it can record both audio and video messages, which further improves the flexibility of the VMS and improves user experience.

In a specific implementation, before the server sends the video greeting pre-recorded by the second terminal to the first terminal, it may determine whether the second terminal has recorded the video greeting. If the second terminal records the video greeting, the server may send the video greeting to the first terminal. If the second terminal does not record the video greeting, the server may send the preset default video greeting as the pre-recorded video greeting of the second terminal to the first terminal for playback by the first terminal. The preset default video greeting can be set by those skilled in the art according to actual needs, which is not specifically limited in this embodiment of the present application.

In an embodiment, if the video media negotiation with the first terminal fails, for example, the first terminal does not support video calls, or the user of the first terminal refuses to perform video media negotiation, it may be determined that the video media negotiation with the first terminal fails. At this time, the type of the media channel accessed by the first terminal is still audio, and the server can send the audio greeting pre-recorded by the second terminal to the first terminal for the first terminal to play the audio greeting. If the second terminal does not record the audio greeting, the server may send the preset default audio greeting as the pre-recorded audio greeting of the second terminal to the first terminal for playback by the first terminal.

In another embodiment, if the video media negotiation with the first terminal fails, the type of the media channel accessed by the first terminal is still audio, the server may send the audio content in the video greeting pre-recorded by the second terminal to the first terminal for the first terminal to play the audio content, so as to further improve the flexibility of the voice mail message system, meet various needs of terminal users of different types, and further improve user experience.

Figure 2:
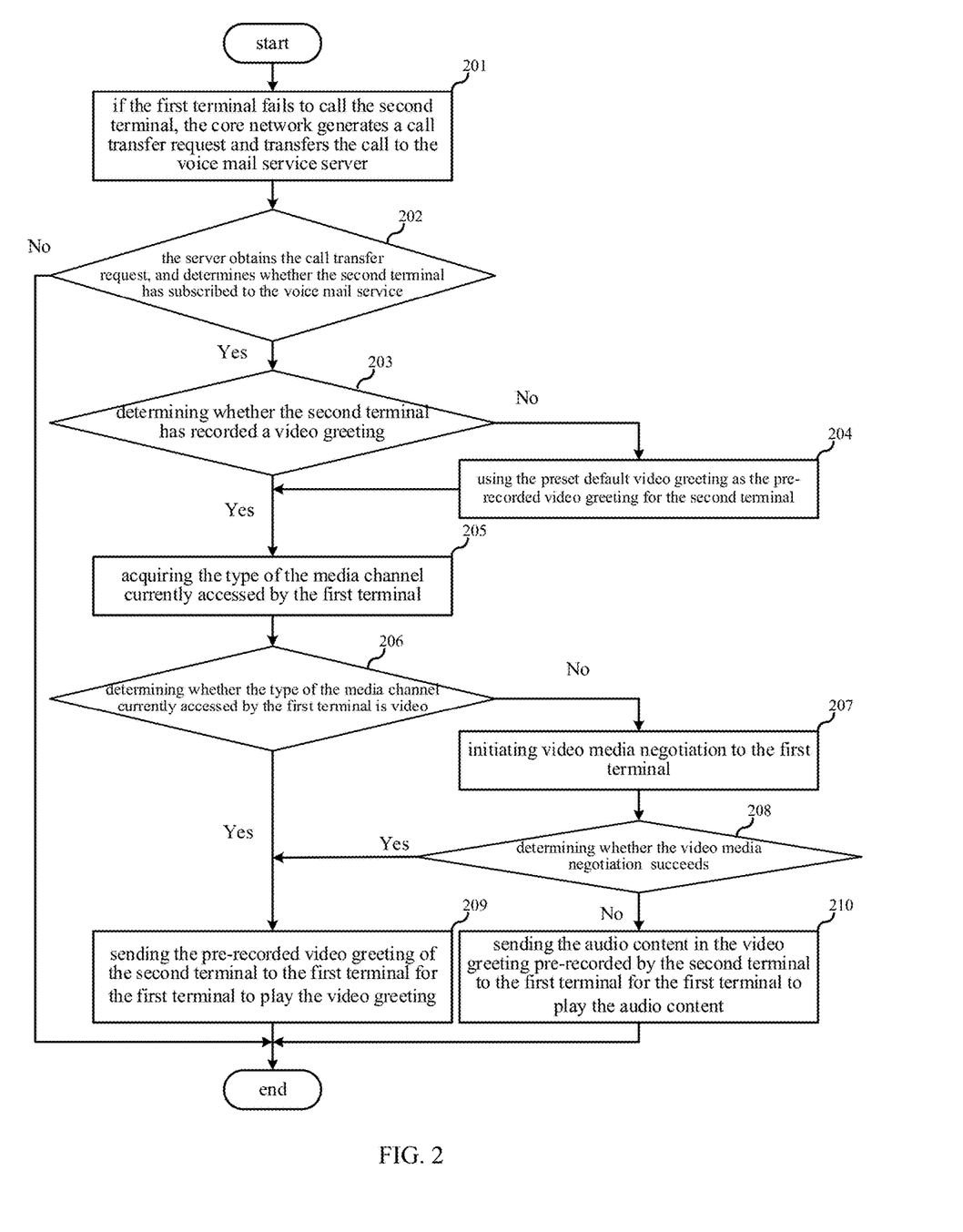
FIG. 2 is a flowchart of a specific implementation of the video greeting playing method according to the first embodiment of the present application.

In an embodiment, the video greeting playing method can be realized by the operations as shown in FIG. 2, and the operations are specifically as follows.

Operation 201, in response to that the call from the first terminal to the second terminal fails, the core network generates a call transfer request, and transfers the call to the server.

Specifically, the core network for carrying call services can monitor calls between terminals in real time. When the call from the first terminal to the second terminal fails, the core network can generate a call transfer request, and transfer the call to the voice mail service server.

Operation 202, the server acquires the call transfer request, and determines whether the second terminal has subscribed to the voice mail service, if yes, perform operation 203, otherwise, end directly.

Specifically, the server can determine whether the second terminal called by the first terminal has subscribed to the voice mail service, and if subscribed, enter subsequent data transmission; if not subscribed, wait for the first terminal to end the call.

Operation 203, determining whether the second terminal has recorded the video greeting, if yes, directly execute operation 205, otherwise, execute operation 204.

Operation 204, using the preset default video greeting as the video greeting pre-recorded by the second terminal.

Specifically, if the second terminal does not record the video greeting, the server may use the preset default video greeting as the video greeting pre-recorded by the second terminal.

Operation 205, acquiring the type of the media channel currently accessed by the first terminal.

Specifically, after acquiring the call transfer request, the server may acquire the type of the media channel currently accessed by the first terminal in the call.

Operation 206, determining whether the type of the media channel currently accessed by the first terminal is video, if yes, directly execute operation 209, otherwise, execute operation 207.

Operation 207, initiating video media negotiation to the first terminal.

Specifically, if the type of the media channel currently accessed by the first terminal is not video, the server may actively initiate video media negotiation to the first terminal. The video media negotiation is configured to change the type of the media channel accessed by the first terminal to video, which can effectively improve the flexibility of the call process.

Operation 208, determining whether the video media negotiation succeeds, if yes, execute operation 209, otherwise, execute operation 210.

Operation 209, sending the video greeting pre-recorded by the second terminal to the first terminal for the first terminal to play the video greeting.

Specifically, if the video media negotiation succeeds, the server may send the video greeting pre-recorded by the second terminal to the first terminal for the first terminal to play the video greeting.

Operation 210, sending the audio content in the video greeting pre-recorded by the second terminal to the first terminal for the first terminal to play the audio content.

Specifically, if the video media negotiation fails, the type of the media channel accessed by the first terminal is still audio, the server may send the audio content in the video greeting pre-recorded by the second terminal to the first terminal for the first terminal to play the audio content.

In the first embodiment of the present application, if the call initiated by the first terminal to the second terminal fails, the server may receive a call transfer request indicating that the call from the first terminal to the second terminal fails. That is, if the first terminal fails to call the second terminal, the call can be transferred to the server and enter the voice mail of the second terminal. The type of the media channel currently accessed by the first terminal is acquired. If the type of the media channel currently accessed by the first terminal is audio, the server actively initiates video media negotiation to the first terminal. That is, the type of the media channel accessed by the first terminal is changed to video, which can effectively improve the flexibility of the call process. If the video media negotiation with the first terminal succeeds, the server sends the video greeting pre-recorded by the second terminal to the first terminal for the first terminal to play. Considering that when the greeting is played, if the first terminal initiates the audio call, even if the voice mail of the second terminal is provided with the video greeting, the first terminal can only play audio greetings, which brings bad user experience to users. However, in the embodiments of the present application, the audio call can be converted to the video call. When the terminal initiates the audio call, it can also play the video greeting, which greatly enriches the functional scope of the voice mail service, improves the user experience, and increases user stickiness and activity.

Figure 3:
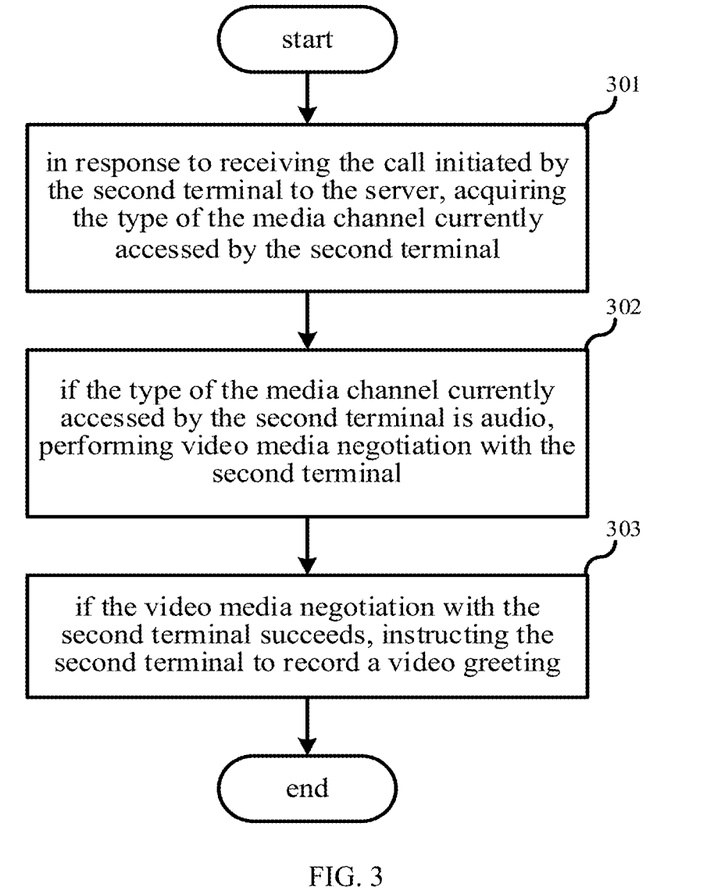
FIG. 3 is a flowchart of pre-recording video greeting according to a second embodiment of the present application.

A second embodiment of the present application relates to a video greeting playing method. The implementation details of the video greeting playing method in this embodiment will be described in detail below. The following contents are only implementation details provided for easy understanding, and are not necessary for implementing this solution. In this embodiment, the process of pre-recording the video greeting in the video greeting playing method is mainly described. FIG. 3 is a flowchart for pre-recording the video greeting described in the second embodiment, including following operations.

Operation 301, in response to receiving a call initiated by the second terminal to the server, acquiring the type of the media channel currently accessed by the second terminal.

Specifically, the server may receive calls initiated by each terminal to the server in real time, and if the server receives a call initiated by the second terminal to the server, the server may acquire the type of the media channel currently accessed by the second terminal.

In a specific implementation, a voice mail system access code is stored inside the server, and the access code is configured to enter the voice mail system. When the server receives the call initiated by the second terminal dialing the voice mail system access code, the server can determine whether the second terminal has subscribed to the voice mail service. If the second terminal has subscribed to the voice mail service, the server can acquire the type of the media channel currently accessed by the second terminal. If the second terminal has not subscribed to the voice mail service, the server determines that the second terminal is an invalid terminal, and releases the call.

In an embodiment, the server internally stores the voice mail passwords corresponding to the terminals that have subscribed to the voice mail service, and the server can acquire the voice mail password input by the second terminal. If the passwords are consistent, the server sends a login success message to the second terminal. If the passwords are inconsistent, the server sends a password error message to the second terminal. If the voice mail passwords input by the second terminal are inconsistent with the voice mail passwords corresponding to the second terminal stored in the server within the preset number of consecutive thresholds, the server sends a login failure message to the second terminal and releases the call.

In an embodiment, the type of the media channel currently accessed by the second terminal may be audio, that is, the second terminal initiates an audio call, and the audio coding capabilities may include but not limited to: AAC, ADPCM, and FLAC.

In another example, the type of the media channel currently accessed by the second terminal may be video, that is, the second terminal initiates a video call, and the video encoding capabilities may include but not limited to: H.263, H.264, etc.

Operation 302, in response to that the type of the media channel currently accessed by the second terminal is audio, performing video media negotiation with the second terminal.

The video media negotiation between the server and the second terminal may be understood as that the server initiates the video media negotiation to the second terminal.

Specifically, after the server acquires the type of the media channel currently accessed by the second terminal, it may determine whether the type of the media channel currently accessed by the second terminal is audio. If the type of the media channel currently accessed by the second terminal is audio, the server actively initiates video media negotiation to the second terminal. If the type of the media channel currently accessed by the second terminal is video, the server does not need to initiate video media negotiation to the second terminal, and directly performs subsequent data transmission. The video media negotiation is configured to change the type of the media channel accessed by the second terminal to video, which can effectively improve the flexibility of the call process.

In a specific implementation, the signaling responsible for video media negotiation can be set by those skilled in the art according to actual needs, such as update signaling and re-invite signaling, etc., which are not specifically limited in the embodiments of the present application.

Operation 303, in response to that the video media negotiation with the second terminal succeeds, instructing the second terminal to record a video greeting.

Specifically, after the server initiates video media negotiation with the second terminal, it may determine whether the video media negotiation with the second terminal succeeds. If the video media negotiation with the second terminal succeeds, the server may instruct the second terminal to record a video greeting. Even if the second terminal is an audio call, it can also record a video greeting to further improve the user experience.

In an embodiment, if the video media negotiation with the second terminal fails, for example, the second terminal does not support video calls, or the user of the second terminal refuses to perform video media negotiation, it can be determined that the video media negotiation with the second terminal fails. At this time, the type of the media channel accessed by the second terminal is still audio, and the server may issue a recording prompt to the second terminal, instructing the second terminal to record the audio greeting.

In another embodiment, after the server instructs the second terminal to record the audio greeting, it can generate a video greeting according to the audio greeting and the preset default video, and use the generated video greeting as the recorded video greeting. Even if the second terminal does not support recording the video greeting, the server can generate the video greeting based on the audio greeting and the preset default video, which improves the richness and fun of voice mail system services and better meets user needs. The preset default video can be set by those skilled in the art, which is not specifically limited in this embodiment of the present application.

In an embodiment, the second terminal may access the voice mail service portal through a browser, log in to the voice mail service portal and upload the recorded video greeting, and/or record the video greeting in real time.

Figure 4:
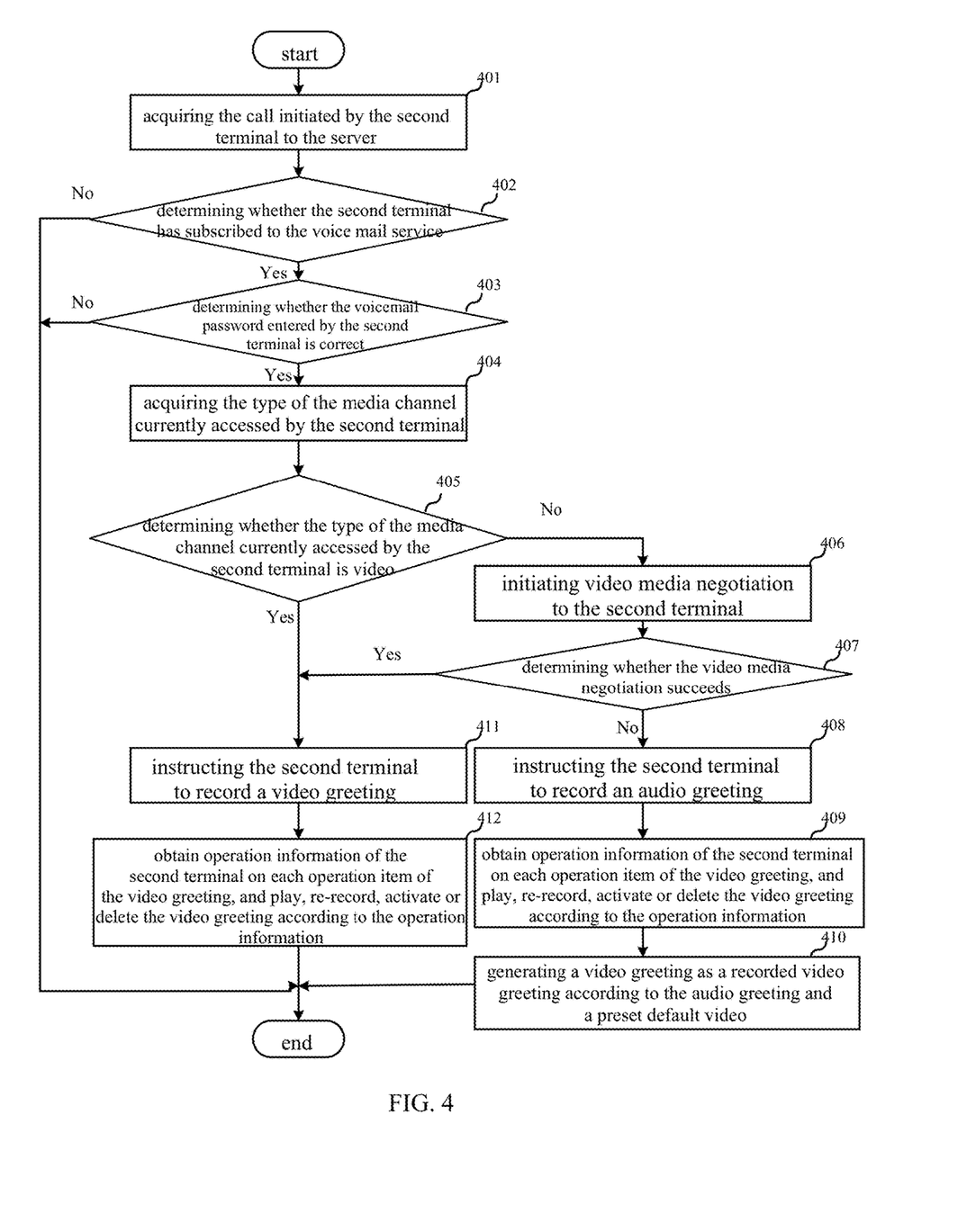
FIG. 4 is a flowchart of a specific implementation of pre-recording the video greeting according to the second embodiment of the present application.

In an embodiment, recording the video greeting can be implemented by the operations as shown in FIG. 4, and the operations are specifically as follows.

Operation 401, acquiring the call initiated by the second terminal to the server;

Specifically, the server can monitor the calls made by each terminal to the server in real time, and acquire the call initiated by the second terminal to the server.

Operation 402, determining whether the second terminal has subscribed to the voice mail service, if yes, execute operation 403, otherwise, end directly.

Operation 403, determining whether the voice mail password input by the second terminal is correct, if yes, execute operation 404, otherwise, end directly.

Specifically, the server internally stores the voice mail passwords corresponding to the terminals that have subscribed to the voice mail service, and the server can acquire the voice mail password input by the second terminal. If the passwords are consistent, the server sends a login success message to the second terminal. If the passwords are inconsistent, the server sends a password error message to the second terminal. If the voice mail passwords input by the second terminal are inconsistent with the voice mail passwords corresponding to the second terminal stored in the server within the preset number of consecutive thresholds, the server sends a login failure message to the second terminal and releases the call.

Operation 404, acquiring the type of the media channel currently accessed by the second terminal.

Specifically, if the voice mail password input by the second terminal is correct, the server can acquire the type of the media channel currently accessed by the second terminal.

Operation 405, determining whether the type of the media channel currently accessed by the second terminal is video, if yes, execute operation 411, otherwise, execute operation 406.

Operation 406, initiating video media negotiation to the second terminal.

Specifically, if the type of the media channel currently accessed by the second terminal is audio, the server may actively initiate video media negotiation to the second terminal. The video media negotiation is configured to change the type of the media channel accessed by the second terminal to video.

Operation 407, determining whether the video media negotiation succeeds, if yes, execute operation 411, otherwise, execute operation 408.

Operation 408, instructing the second terminal to record the audio greeting.

Specifically, if the video media negotiation fails, the server may instruct the second terminal to record the audio greeting.

Operation 409, acquiring operation information of the second terminal on each operation item of the audio greeting, and performing operations of playing, re-recording, activating or deleting the audio greeting according to the operation information.

Specifically, after the server acquires the audio greeting recorded by the second terminal, the second terminal is allowed to operate on each operation item of the audio greeting, acquire the operation information, and perform operations of playing, re-recording, activating or deleting the audio greeting according to the operation information.

In an embodiment, the server acquires the instruction for playing the audio greeting sent by the second terminal, and the server sends the audio greeting to the second terminal for the second terminal to play. After the playback is completed, the server continues to acquire the operation information of the second terminal on each operation item of the audio greeting until the second terminal hangs up, and the process ends.

In an embodiment, the server acquires the instruction for re-recording the audio greeting sent by the second terminal, and the server instructs the second terminal to re-record the audio greeting. After the re-recording is completed, the server continues to acquire the operation information of the second terminal on each operation item of the audio greeting until the second terminal hangs up, and the process ends.

In an example, the server acquires the instruction for activating the audio greeting sent by the second terminal, and uses the audio greeting as the audio greeting corresponding to the second terminal. After the activation is completed, the server continues to acquire the operation information of the second terminal on each operation item of the audio greeting until the second terminal hangs up, and the process ends.

In an embodiment, the server acquires the instruction for deleting the audio greeting sent by the second terminal, deletes the audio greeting originally set by the second terminal, and/or deletes the audio greeting just recorded. After the deletion is completed, the server continues to acquire the operation information of the second terminal on each operation item of the audio greeting until the second terminal hangs up, and the process ends.

Operation 410, generating a video greeting as a recorded video greeting according to the audio greeting and a preset default video.

Specifically, after acquiring the audio greeting recorded by the second terminal, the server may generate the video greeting as the recorded video greeting according to the audio greeting and the preset default video.

Operation 411, instructing the second terminal to record the video greeting.

Specifically, if the video media negotiation succeeds, the server may instruct the second terminal to record the video greeting.

Operation 412, acquiring operation information of the second terminal on each operation item of the video greeting, and perform operations of playing, re-recording, activating or deleting the video greeting according to the operation information.

Specifically, after the server acquires the video greeting recorded by the second terminal, the second terminal is allowed to operate on each operation item of the video greeting, acquire the operation information, and perform operations of playing, re-recording, activating or deleting the video greeting according to the operation information.

In an embodiment, the server acquires the instruction for playing the video greeting sent by the second terminal, and the server sends the video greeting to the second terminal for the second terminal to play. After the playback is completed, the server continues to acquire the operation information of the second terminal on each operation item of the video greeting until the second terminal hangs up, and the process ends.

In an embodiment, the server acquires the instruction for re-recording the video greeting sent by the second terminal, and the server instructs the second terminal to re-record the video greeting. After the re-recording is completed, the server continues to acquire the operation information of the second terminal on each operation item of the video greeting until the second terminal hangs up, and the process ends.

In an example, the server acquires the instruction for activating the video greeting sent by the second terminal, and uses the video greeting as the video greeting corresponding to the second terminal. After the activation is completed, the server continues to acquire the operation information of the second terminal on each operation item of the video greeting until the second terminal hangs up, and the process ends.

In an embodiment, the server acquires the instruction for deleting the video greeting sent by the second terminal, deletes the video greeting originally set by the second terminal, and/or deletes the video greeting just recorded. After the deletion is completed, the server continues to acquire the operation information of the second terminal on each operation item of the video greeting until the second terminal hangs up, and the process ends.

In an example, after the server completes the operation on the video greeting, the server can acquire the operation on the voice mail of the second terminal, such as change voice mail password, etc.

In the second embodiment of the present application, if the call initiated by the second terminal to the server is received, the type of the media channel currently accessed by the second terminal is acquired. If the type of the media channel currently accessed by the second terminal is audio, the video media negotiation is performed with the second terminal. If the video media negotiation with the second terminal succeeds, the second terminal is instructed to record the video greeting. Even if the second terminal initiates the audio call, the video greeting can be recorded to further improve user experience. If the video media negotiation with the second terminal fails, the second terminal is instructed to record the audio greeting. The video greeting is generated based on the audio greeting and the preset default video, and the generated video greeting is used as the recorded video greeting. Even if the second terminal does not support recording the video greeting, the embodiments of the present application can also generate the video greeting according to the audio greeting recorded by the second terminal and the preset default video, thereby enhancing the richness and fun of voice mail system services to better meet user needs.

Figure 5:
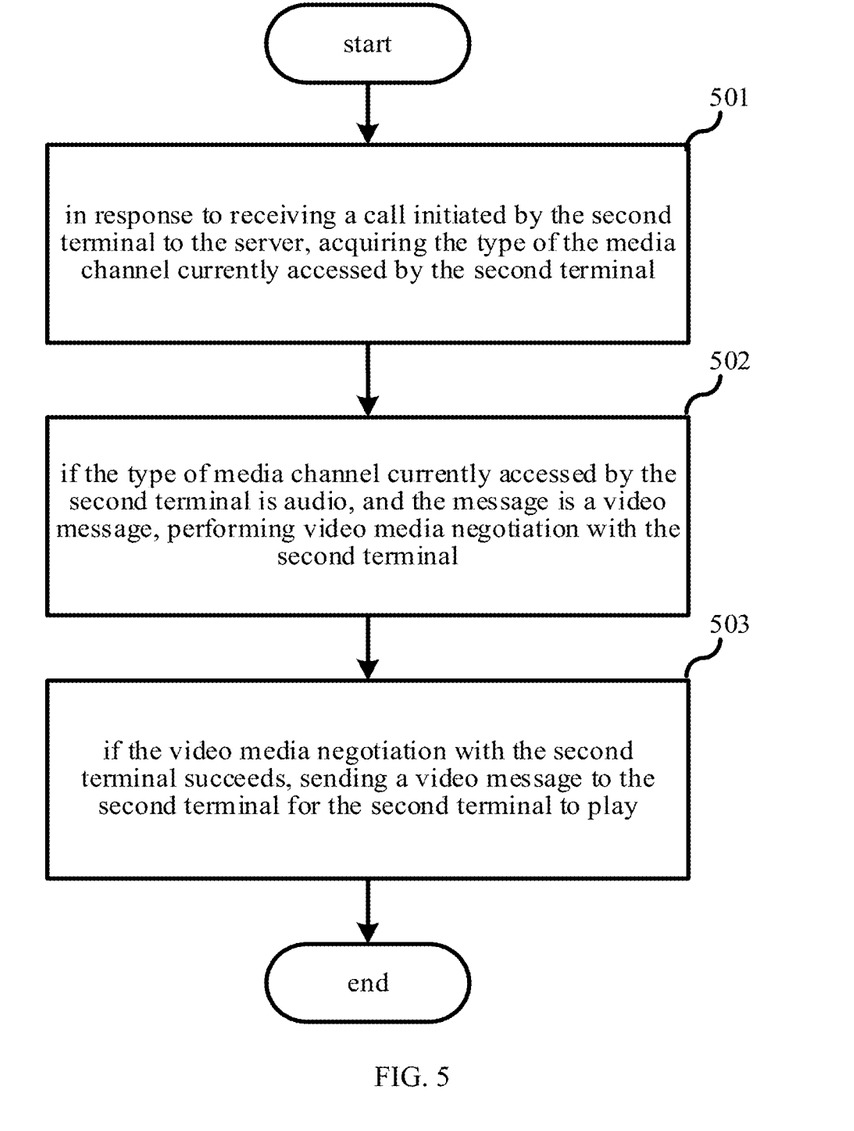
FIG. 5 is a flowchart of playing a message according to a third embodiment of the present application.

A third embodiment of the present application relates to a video greeting playing method. The implementation details of the video greeting playing method in this embodiment will be described in detail below. The following contents are only implementation details provided for easy understanding, and are not necessary for implementing this solution. In this embodiment, the process of playing the message in the video greeting playing method is mainly described. FIG. 5 is a flowchart for playing the message in the third embodiment, including following operations.

Operation 501, in response to receiving a call initiated by the second terminal to the server, obtaining the type of the media channel currently accessed by the second terminal;

Operation 501 has been described in the second embodiment, and will not be repeated here.

Operation 502, in response to that the type of the media channel currently accessed by the second terminal is audio, and the message is a video message, performing video media negotiation with the second terminal.

The video media negotiation between the server and the second terminal may be understood as that the server initiates the video media negotiation to the second terminal.

Specifically, after the server obtains the type of the media channel currently accessed by the second terminal, it can determine whether the message received by the second terminal is the video message. If the message received by the second terminal is an audio message, the server directly sends the audio message to the second terminal for playback by the second terminal. That is, when the message is the audio message, there is no need to perform video media negotiation, which can effectively save signaling resources. If the message received by the second terminal is a video message, the server can determine whether the type of the media channel currently accessed by the second terminal is audio. If the type of the media channel currently accessed by the second terminal is audio, the server actively initiates video media negotiation to the second terminal. If the type of the media channel currently accessed by the second terminal is video, the server does not need to initiate video media negotiation to the second terminal, and directly performs subsequent data transmission. The video media negotiation is configured to change the type of the media channel accessed by the second terminal to video, which can effectively improve the flexibility of the call process.

In a specific implementation, the signaling responsible for video media negotiation can be set by those skilled in the art according to actual needs, such as update signaling and re-invite signaling, etc., which are not specifically limited in the embodiments of the present application.

In an embodiment, after obtaining the type of the media channel currently accessed by the second terminal, the server may directly determine the type of the media channel currently accessed by the second terminal without determining the type of the message received by the second terminal.

Operation 503, in response to that the video media negotiation with the second terminal succeeds, sending a video message to the second terminal for the second terminal to play.

Specifically, after the server initiates the video media negotiation with the second terminal, it may determine whether the video media negotiation with the second terminal succeeds. If the video media negotiation with the second terminal succeeds, the server may send the video message to the second terminal for the second terminal to play. Even if the second terminal initiates an audio call, it can also play the video message, further improving the user experience.

In an embodiment, if the video media negotiation with the second terminal fails, the type of the media channel accessed by the second terminal is still audio, the server may send the audio content in the video message to the second terminal for the second terminal to play the audio content, which can prevent the second terminal from missing the information in the video message, further improve the flexibility of the voice mail system, and improve the user experience.

In an embodiment, the second terminal may record the video greeting and play the message during the same call with the server, and there is no sequence for the two, which is not specifically limited in this embodiment of the present application.

For example, after the server receives the call initiated by the second terminal to the server, the server can send an instruction for playing a message and an instruction for recording a video greeting to the second terminal for the second terminal to choose. If the second terminal chooses to respond to the instruction for playing the message, the server enters the process of playing the message, and after the message is played, the server can send the instruction for recording the video greeting to the second terminal again. If the second terminal chooses to respond to the instruction for recording the video greeting, the server enters the process of recording the video greeting, and after the recording of the video greeting is completed, the server can also send the instruction for playing the message to the second terminal again. If the second terminal does not respond to any instruction within the preset time threshold, the server can enter the process of recording the video greeting and playing the message in a preset order. The preset time threshold and the preset sequence can be set by those skilled in the art according to actual needs.

In the third embodiment of the present application, if the call initiated by the second terminal to the server is received, the type of the media channel currently accessed by the second terminal is acquired. If the type of the media channel currently accessed by the second terminal is audio and the message is the video message, the video media negotiation is performed with the second terminal. If the video media negotiation with the second terminal succeeds, the video message is sent to the second terminal for the second terminal to play. Even if the second terminal initiates an audio call, it can also play a video message, further improving the user experience. If the video media negotiation in the second terminal fails, the audio content in the video message is played to the second terminal, which can prevent the second terminal from missing the information in the video message, further improve the flexibility of the voice mail system, and improve the user experience.

A fourth embodiment of the present application relates to a video greeting playing method, which is applied to a first terminal. The implementation details of the video greeting playing method of the present embodiment are described in detail below. The following contents are only implementation details provided for easy understanding, and are not necessary for implementing this solution.

Figure 6:
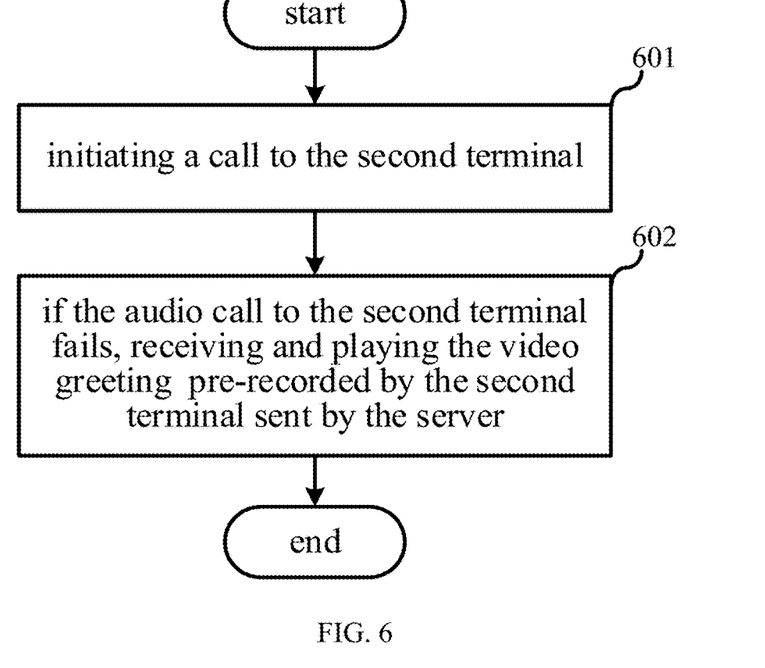
FIG. 6 is a flowchart of the video greeting playing method according to a fourth embodiment of the present application.

The specific flowchart of the video greeting playing method in this embodiment can be as shown in FIG. 6, including following operations.

Operation 601, initiating a call to a second terminal.

Specifically, the first terminal may initiate a call to the second terminal.

In an example, each terminal has its own corresponding number (such as a SIM number, etc.), and the first terminal dials the corresponding number to implement a call to the terminal corresponding to the number.

Operation 602, if the audio call to the second terminal fails, receiving a video greeting pre-recorded by the second terminal sent by the server, and playing the video greeting;

Specifically, after the first terminal initiates the call to the second terminal, if the audio call to the second terminal fails, the server receives the pre-recorded video greeting sent by the second terminal, and plays the video greeting.

In an embodiment, after the audio call fails, the display interface of the first terminal can display prompt information. The prompt information is configured to prompt the user corresponding to the first terminal to choose whether to play the video greeting pre-recorded by the second terminal. If the user corresponding to the first terminal chooses to play the video greeting pre-recorded by the second terminal, the first terminal receives the video greeting pre-recorded by the second terminal sent by the server, and plays the video greeting.

Figure 7:
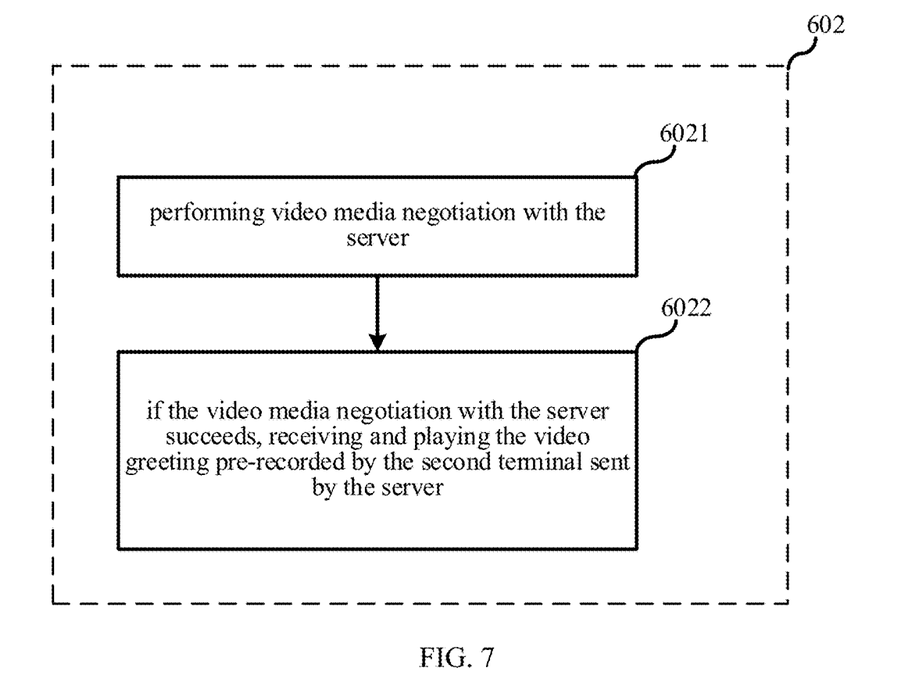
FIG. 7 is a flowchart of receiving and playing the video greeting pre-recorded by the second terminal sent by the server if the audio call initiated to the second terminal fails according to the fourth embodiment of the present application.

In an embodiment, if the audio call initiated to the second terminal fails, receiving the video greeting pre-recorded by the second terminal sent by the server, and playing the video greeting can be realized by each sub-operation as shown in FIG. 7, which specifically includes following operations.

Sub-operation 6021, performing video media negotiation with the server.

Specifically, the first terminal may perform the video media negotiation with the server. When the server receives a call transfer request indicating that the first terminal fails to call the second terminal, the server acquires the type of the media channel currently accessed by the first terminal, and when the type of the media channel currently accessed by the first terminal is audio, the server performs the video media negotiation with the first terminal.

In a specific implementation, if the first terminal fails to call the second terminal, the display interface of the first terminal provides a virtual button to inquire whether the user of the first terminal is transferred to the voice mail corresponding to the second terminal. If the user of the first terminal decides to transfer to the voice mail corresponding to the second terminal, and the second terminal has recorded the video greeting, the virtual button is provided on the display interface of the first terminal to ask the user of the first terminal whether to play the video greeting. If the user of the first terminal determines to play the video greeting, and the type of the media channel currently accessed by the first terminal is audio, the server actively initiates video media negotiation to the first terminal, and the first terminal receives the video media negotiation actively initiated by the server. The inquiry method may also be inputting a corresponding number according to a prompt, which is not specifically limited in this embodiment of the present application.

In an embodiment, the server determines that the type of the media channel currently accessed by the first terminal is audio, and the audio coding capability of the first terminal is AAC, then the server can send re-invite signaling to the first terminal to perform video media negotiation with the video coding capability of H.264, and the first terminal receives the video media negotiation that the video coding capability is H.264 initiated by the server through the re-invite signaling.

In another embodiment, if the type of the media channel currently accessed by the first terminal is video, there is no need to perform video media negotiation.

Operation 6022, if the video media negotiation with the server succeeds, receiving and playing the video greeting pre-recorded by the second terminal sent by the server.

Specifically, if the server determines that the video media negotiation with the first terminal succeeds, the first terminal may receive and play the video greeting pre-recorded by the second terminal sent by the server.

In an embodiment, the first terminal may reject the video media negotiation initiated by the server, and the server determines that the video media negotiation fails, and the type of the media channel accessed by the first terminal is still audio.

Since the first embodiment to the third embodiment correspond to this embodiment, this embodiment can be implemented in cooperation with the first embodiment to the third embodiment. The relevant technical details mentioned in the first embodiment to the third embodiment are still valid in this embodiment. The technical effects that can be achieved in the first embodiment to the third embodiment can also be achieved in this embodiment, and in order to reduce repetition, details are not repeated here. Correspondingly, the relevant technical details mentioned in this embodiment can also be applied in the first embodiment to the third embodiment.

A fifth embodiment of the present application relates to a video greeting playing system. The details of the video greeting playing system in this embodiment are described in detail below. The following contents are only the implementation details provided for the convenience of understanding, and are not necessary for the implementation of this solution. FIG. 7 is a schematic diagram of the video greeting playing system described in the fifth embodiment, including a core network 701, a server 702, a first terminal 703 and a second terminal 704.

The core network 701 is configured to send to the server 702 a call transfer request indicating that the first terminal 703 fails to call the second terminal 704 after determining that the first terminal 703 fails to call the second terminal 704.

The server 702 is configured to receive the call transfer request, and acquire a type of a media channel currently accessed by the first terminal 703; in response to that the type of the media channel currently accessed by the first terminal 703 is audio, perform video media negotiation with the first terminal 703; in response to that the video media negotiation with the first terminal succeeds, send a video greeting pre-recorded by the second terminal 704 to the first terminal 703.

The first terminal 703 is configured to initiate a call to the second terminal 704; if the call fails, in response to the video media negotiation initiated by the server 702, receive and play the video greeting pre-recorded by the second terminal 704 sent by the server 702.

Figure 8:
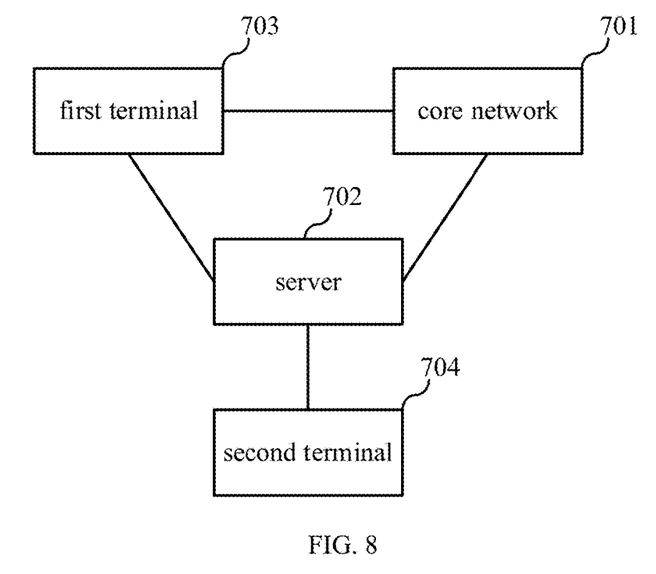
FIG. 8 is a block diagram of a video greeting playing system according to a fifth embodiment of the present application.

In an embodiment, the server 702 may be composed of various submodules as shown in FIG. 8, including: a media signaling gateway 7021, a media server 7022, a voice mail service server 7023, a memory 7024, a database 7025, and a voice mail service portal 7026.

The media signaling gateway 7021 is configured to communicate with the core network 701 through session initiation protocol (SIP for short) signaling and real-time transport protocol (RTP for short) signaling.

The media server 7022 is configured to initiate video media negotiation to the first terminal; if the video media negotiation succeeds, send the video greeting pre-recorded by the second terminal to the first terminal.

The voice mail service server 7023 is configured to receive the call transfer request and acquire the type of the media channel currently accessed by the first terminal.

The memory 7024 is configured to store files such as video greetings.

The database 7025 is configured to store data such as system configuration, service configuration, and voice mail user information.

The voice mail service portal 7026 is configured to perform functions such as user login verification and video greeting management.

It is not difficult to find that this embodiment is a device embodiment corresponding to the first to fourth embodiments, and this embodiment can be implemented in cooperation with the first to fourth embodiments. The relevant technical details and technical effects mentioned in the first to fourth embodiments are still valid in this embodiment, and will not be repeated here to reduce repetition. Correspondingly, the relevant technical details mentioned in this embodiment can also be applied in the first to fourth embodiments.

It is worth mentioning that each module involved in this embodiment is a logic module. In practical applications, a logical unit may be a physical unit, may also be a part of a physical unit, and may also be realized by a combination of multiple physical units. In addition, in order to highlight the innovative part of the present application, units that are not closely related to solving the technical problem proposed in the present application are not introduced in this embodiment, but this does not mean that there are no other units in this embodiment.

Figure 9:
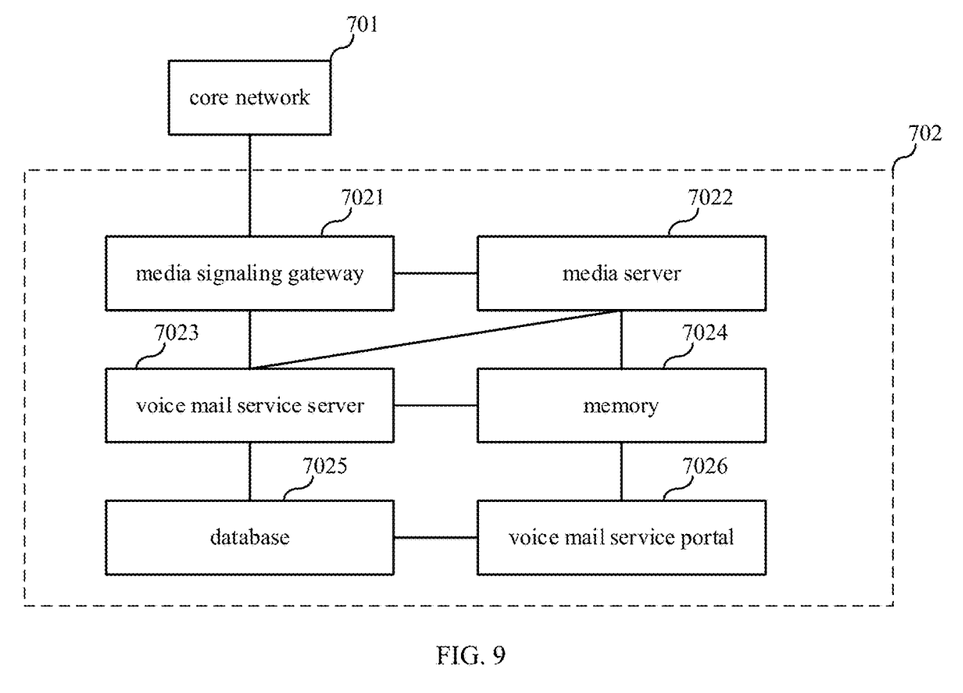
FIG. 9 is a block diagram of a server according to a fifth embodiment of the present application.
Figure 10:
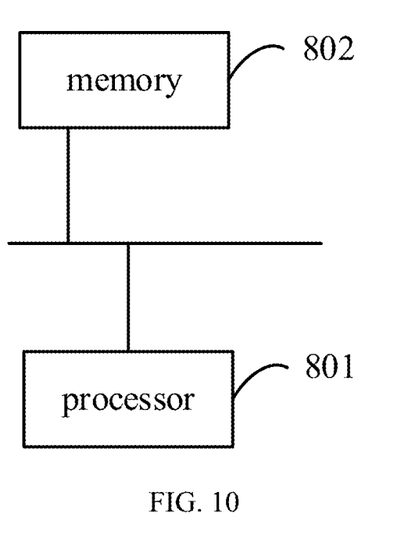
FIG. 10 is a schematic structural diagram of a server according to a sixth embodiment of the present application.

A sixth embodiment of the present application relates to a server, as shown in FIG. 9, including: at least one processor 801; and a memory 802 communicated with the at least one processor 801. The memory 802 stores instructions executable by the at least one processor 801. When the instructions are executed by the at least one processor 801, the at least one processor 801 can execute the video greeting playing method in the foregoing embodiments.

The memory and the processor are connected by a bus, and the bus may include any number of interconnected buses and bridges, and the bus connects one or more processors and various circuits of the memory together. The bus may also connect together various other circuits such as peripherals, voltage regulators, and power management circuits, all of which are known in the art. Therefore, it is not described further herein. The bus interface provides an interface between the bus and the transceiver. The transceiver may be a single element or multiple elements, such as multiple receivers and transmitters, providing means for communicating with various other devices over a transmission medium. The data processed by the processor is transmitted on the wireless medium through the antenna, further, the antenna also receives the data and transmits the data to the processor.

The processor is responsible for managing the bus and general processing, and can also provide various functions, including timing, peripheral interface, voltage regulation, power management, and other control functions. Instead, memory can store data that the processor uses when performing operations.

A seventh embodiment of the present application relates to a computer-readable storage medium storing a computer program. The above method embodiments are implemented when the computer program is executed by the processor.

That is, those skilled in the art can understand that all or part of the operations of the methods in the above embodiments can be completed by instructing related hardware through programs. The program is stored in a storage medium, and includes several instructions for enabling a device (which may be a single-chip microcomputer, a chip, etc.) or a processor to execute all or part of the operations of the methods described in various embodiments of the present application. The aforementioned storage medium includes: various media capable of storing program codes such as U disk, mobile hard disk, read-only memory (ROM for short), random access memory (RAM for short), magnetic disk or optical disk.

Those of ordinary skill in the art can understand that the above-mentioned embodiments are specific embodiments for implementing the present application, and various changes may be made in form and detail in actual application without departing from the scope of the present application.

What is claimed is:

1. A video greeting playing method, applied to a server, comprising:

in response to receiving a call transfer request indicating that a first terminal fails to call a second terminal, acquiring a type of a media channel currently accessed by the first terminal;

in response to that the type of the media channel currently accessed by the first terminal is audio, performing video media negotiation with the first terminal; and in response to that the video media negotiation with the first terminal succeeds, sending a video greeting pre-recorded by the second terminal to the first terminal for the first terminal to play the video greeting;

wherein the video greeting is pre-recorded by the following manner:

in response to receiving a call initiated by the second terminal to the server, acquiring a type of the media channel currently accessed by the second terminal;

in response to that the type of the media channel currently accessed by the second terminal is audio, performing video media negotiation with the second terminal; and in response to that the video media negotiation with the second terminal succeeds, instructing the second terminal to record the video greeting;

wherein after performing the video media negotiation with the second terminal, the method further comprises:

in response to that the video media negotiation with the second terminal fails, instructing the second terminal to record an audio greeting; and generating the video greeting according to the audio greeting and a preset default video, and using the generated video greeting as the recorded video greeting.

2. The video greeting playing method according to claim 1, wherein after performing the video media negotiation with the first terminal, the method further comprises:

in response to that the video media negotiation with the first terminal fails, sending an audio content in the video greeting pre-recorded by the second terminal to the first terminal for the first terminal to play the audio content.

3. The video greeting playing method according to claim 1, wherein after sending the video greeting pre-recorded by the second terminal to the first terminal for the first terminal to play the video greeting, the method further comprises:

instructing the first terminal to record a message according to the video greeting, wherein the message is an audio message and/or a video message.

4. The video greeting playing method according to claim 3, wherein the second terminal plays the message in the following manner:

in response to receiving a call initiated by the second terminal to the server, acquiring a type of the media channel currently accessed by the second terminal;

in response to that the type of the media channel currently accessed by the second terminal is audio and the message is the video message, performing video media negotiation with the second terminal; and in response to that the video media negotiation with the second terminal succeeds, sending the video message to the second terminal for the second terminal to play the video message.

5. The video greeting playing method according to claim 4, wherein after performing the video media negotiation with the second terminal, the method further comprises:

in response to that the video media negotiation with the second terminal fails, playing the audio content in the video message to the second terminal.

6. A server, comprising:

at least one processor; and a memory communicated with the at least one processor, wherein the memory stores instructions executable by the at least one processor, when the instructions are executed by the at least one processor, the at least one processor performs the video greeting playing method according to claim 1.

7. A non-transitory computer-readable storage medium storing a computer program, wherein when the computer program is executed by a processor, the video greeting playing method according to claim 1 is realized.

8. A video greeting playing system, comprising: a core network, a server, a first terminal and a second terminal, wherein the core network is configured to send to the server a call transfer request indicating that the first terminal fails to call the second terminal after determining that the first terminal fails to call the second terminal;

wherein the server is configured to receive the call transfer request, and acquire a type of a media channel currently accessed by the first terminal; in response to that the type of the media channel currently accessed by the first terminal is audio, perform video media negotiation with the first terminal; in response to that the video media negotiation with the first terminal succeeds, send a video greeting pre-recorded by the second terminal to the first terminal; and wherein the first terminal is configured to initiate a call to the second terminal; in response to that the call fails, perform video media negotiation with the server, receive and play the video greeting pre-recorded by the second terminal sent by the server;

wherein the video greeting is pre-recorded by the following manner:

in response to receiving a call initiated by the second terminal to the server, acquiring a type of the media channel currently accessed by the second terminal;

in response to that the type of the media channel currently accessed by the second terminal is audio, performing video media negotiation with the second terminal; and in response to that the video media negotiation with the second terminal succeeds, instructing the second terminal to record the video greeting;

wherein the server is further configured to in response to that the video media negotiation with the second terminal fails, instruct the second terminal to record an audio greeting; and generate the video greeting according to the audio greeting and a preset default video, and use the generated video greeting as the recorded video greeting.

* * * * *